Sept. 17, 1940.   J. A. SCHMITT   2,215,018
CLEANER FOR DAIRY EQUIPMENT
Filed May 23, 1938
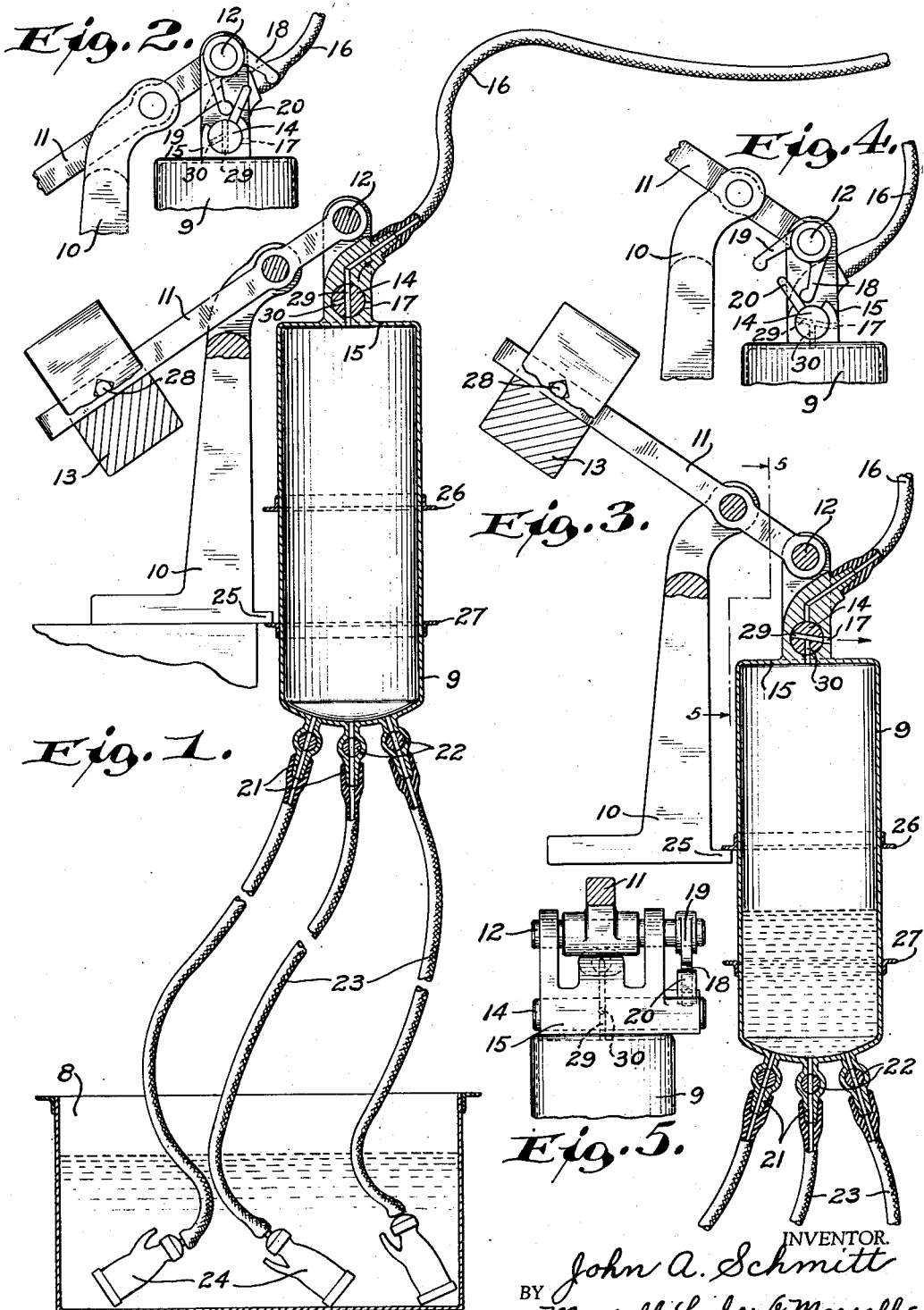
INVENTOR.
John A. Schmitt
BY Morsell, Lieber & Morsell
ATTORNEYS.

Patented Sept. 17, 1940

2,215,018

UNITED STATES PATENT OFFICE 2,215,018

CLEANER FOR DAIRY EQUIPMENT

John A. Schmitt, Waukesha, Wis., assignor to The Universal Milking Machine Company, Waukesha, Wis., a corporation of Wisconsin Application May 23, 1938, Serial No. 209,435

3 Claims. (Cl. 141—1)

The present invention relates in general to improvements in cleaning apparatus for dairy equipment, and relates more specifically to improvements in the construction and operation of mechanism for washing and sterilizing the teat cups and hose connections of milking machines or the like.

Generally defined, an object of my present invention is to provide an improved cleanser for dairy equipment or the like, which is extremely simple and compact in construction, and which is moreover highly efficient in operation.

It has heretofore been proposed as shown in Patent No. 1,645,356, granted October 11, 1927, to provide automatic dairy equipment cleaning mechanism especially adapted for washing and sterilizing the teat cups and hose connections of milking machines or the like, with the aid of a vacuum such as normally exists in the regular vacuum line of a milking plant. In this prior cleaning apparatus, the teat cups are positioned within a receptacle having washing and sterilizing liquid therein, and the hoses which lead from the cups are connected to a tank the interior of which is alternately connectable to the vacuum line and to atmosphere, to automatically cause the cleansing liquid to surge back and forth through the cups and connections. While this prior apparatus is highly successful in actual commercial use, it is rather complicated and relatively costly, and therefore is not readily available to the small dairy.

It is therefore a more specific object of my present invention to provide a simplified mechanism for automatically and effectively washing and sterilizing such dairy equipment, which may be manufactured and sold at moderate cost, and which utilizes the same general principle as that which has proven so successful in the prior mechanism hereinabove referred to.

Another specific object of this invention is to provide new and useful cleansing apparatus for dairy equipment or the like, which is compact and durable in construction, and which may be conveniently installed and operated with minimum attention.

A further specific object of the invention is to provide an improved dairy equipment cleaning unit which is extremely effective and reliable in operation, and which quickly washes the teat cups and hose connections and is operable by a novice.

These and other specific objects and advantages of the present invention will be apparent from the following detailed description.

A clear conception of the improved features, and of the mode of constructing and of utilizing dairy equipment cleaning apparatus built in accordance with the present improvement, may be had by referring to the drawing accompanying and forming a part of this specification, wherein like reference characters designate the same or similar parts in the various views.

Fig. 1 is a somewhat diagrammatic sectional view of my improved dairy equipment cleanser, showing the surge tank in uppermost position with the liquid drained therefrom;

Fig. 2 is an elevation of a fragment of the cleanser, showing the control valve actuating mechanism in a position corresponding to that of Fig. 1;

Fig. 3 is a view similar to that of Fig. 1, but showing the surge tank in lowermost position with cleansing liquid therein;

Fig. 4 is an elevation similar to that of Fig. 2, but showing the control valve actuating mechanism in a position corresponding to that of Fig. 3; and Fig. 5 is a section through the apparatus taken along the line 5—5 of Fig. 3.

While my improved cleaner has been shown rather diagrammatically and as being especially adapted to wash and sterilize dairy equipment such as teat cups and the hose connections therefor, it is not the intent to thereby unnecessarily restrict the scope.

Referring to the drawing, my present improved cleansing apparatus comprises in general a washing and sterilizing liquid container or reservoir 8; a surge tank 9 suspended for vertical movement or reciprocation above the reservoir 8; a frame or fixed support 10 disposed in proximity to the tank 9; a lever 11 swingably suspended at its medial portion upon the frame support 10 and having one end articulably connected to the tank 9 by means of a hinge or pivot pin 12; a weight 13 adjustably associated with the opposite end portion of the lever 11; a control valve 14 oscillatably mounted in the upper end head 15 of the tank 9; a vacuum connection 16 connectable with the tank 9 through the control valve 14 when the tank 9 is in elevated position; a port 17 communicable with the ambient atmosphere, and being connectable with the tank 9 through the control valve 14 when the tank is in lowered position; striker arms 18, 19 operable by the lever 11 through the pivot pin 12 and being cooperable with a control valve actuating arm 20 to oscillate the valve 14; and nipples 21 or the like carried by the lower end of the tank 9 and having shutoff plug valves 22 therein, these nipples being attachable to the hose connections 23 leading to the teat cups 24, or to similar dairy equipment.

The liquid container or supply reservoir 8 may be of any desired capacity and construction, and is preferably supplied with an abundance of lye liquid such as water. The vertically movable surge tank 9 may be formed of sheet metal, and the upper end head 15 thereof may if desired be made conveniently removable so as to permit access to the tank interior for cleaning purposes. The supporting frame 10 may be of any suitable construction, and this support should be sufficiently rigid to resist the pulsating action of the tank 9 and weight 13 without tipping. As shown, the frame support 10 is provided with a lateral abutment 25 which is cooperable with upper and lower stop collars 26, 27 respectively, to limit the downward and upward movement of the tank 9.

The lever 11 should be sufficiently strong to properly support the weight 13 and the tank 9 when loaded, and the weight 13 may be adjusted along the lever 11 and is retained in adjusted position by a set screw 28. The pivot pin 12 is secured to and is oscillatable with the lever 11, and the valve actuating fingers or striker arms 18, 19 are rigidly attached to the hinge pin 12 and are spaced apart sufficiently to permit the weight 13 to quickly shift the valve 14 from one position to the other. The valve 14 for controlling communication between the tank 9 and the suction line or connection 16, and between the tank interior and the atmospheric port 17, may be of any suitable type. As shown, this valve 14 is of the rotary type, being journalled for oscillation directly in the end head 15, and the actuating arm 20 is rigidly attached to and is movable with the valve 14. The control valve 14 is provided with a through port or passage 29, and with a second port or passage 30 communicating with the passage 29. When the tank 9 is in uppermost position as shown in Fig. 1, the through passage 29 connects the tank interior with the vacuum line through the flexible connection 16, and the passage 30 and port 17 are shut off; but when the tank 9 is lowered as in Fig. 3, the vacuum connection 16 is cut off, and the tank interior is connected to the ambient atmosphere through the passages 29, 30 and the port 17. The plug valves 22 in the lower nipples 21, merely serve to close off those nipples which are not in actual use, and any desired number of these nipples 21 and valves 22 may be provided. The vacuum line or connection 16 may communicate with any suitable source of reduced pressure, such as the usual vacuum pump which is normally utilized in the operation of milking machines.

During normal operation of my improved dairy equipment cleaner, for the purpose of washing and sterilizing teat cups 24 and their hose connections 23, the flexible hose connections 23 of this apparatus should be attached to the nipples 21, the plug valves 22 should be opened, and the cups 24 should be immersed directly within the lye liquid in the supply reservoir 8. The connection 16 should then be placed in communication with the suction or vacuum source, as in Fig. 1, thus withdrawing the air from the interior of the tank 9. As this air is removed, lye liquid flows from the reservoir 8 through the cups 24 and flexible connections 23 and accumulates within the lower portion of the surge tank 9. When this accumulation of liquid within the tank 9 becomes sufficient so that the weight of the accumulated liquid plus the weight of the tank 9 and of the elements associated directly therewith, is greater than the resistance offered by the counter-weight 13, this weight 13 will rise and the tank 9 will drop correspondingly. As the weight 13 approaches its uppermost position, the finger or arm 18 engages the valve actuating lever arm 20 and shifts the control valve 14 in a counterclockwise direction as viewed in the drawing, thereby shutting off the vacuum connection 16, and placing the interior of the tank 9 in open communication with the ambient atmosphere through the passages 29, 30 and the port 17, as clearly shown in Fig. 3. The fluid pressure or air which is thus admitted to the interior of the tank 9, causes the accumulated liquid in this tank to flow back into the supply reservoir 8 through the nipples 21, hose connections 23 and teat cups 24, and simultaneously permits the weight 13 to become effective to raise or elevate the tank 9. When the emptied tank 9 approaches its uppermost limit of travel, the finger or arm 19 is moved by the weight 13 into engagement with the valve actuating arm 20 and shifts the control valve 14 in a clockwise direction thereby closing off the atmospheric port 17 and again placing the interior of the tank 9 in direct communication with the suction connection 16 through the valve passage 29. This cycle of operations is automatically repeated so long as the connection 16 remains under vacuum, and obviously causes repeated back and forth flowage of the lye liquid through the hose connections 23 and cups 24.

From the foregoing detailed description it will be apparent that my present invention provides an improved cleaner for dairy equipment such as milking machine teat cups and hose connections, which is extremely simple, compact and durable in construction and which is moreover automatic and highly efficient in operation. While specific reference has been made to the use of lye water as a cleaning agent, various other types of washing and sterilizing solutions such as chloride solutions, hot water, or the like may be used. The mechanism is obviously operable by merely connecting the vacuum connection 16 to any suitable source of suction, and the surging action may be readily varied as desired by adjusting the weight 13 along the lever 11. The support 10 may obviously be replaced by any other type of frame structure, and the stops 26, 27 need not necessarily be mounted upon the tank 9 but may be associated with the lever 11. As previously indicated, the rotary valve 14 may be replaced by any other suitable type of control valve, and the use of the spaced fingers 18, 19 is desirable in order to provide the desired time element between successive operations of the control valve 14. When the improved apparatus is operating, the washing and sterilizing liquid is constantly surging back and forth through the equipment which is being cleansed, and when proper cleaning has been effected, the operation of the mechanism may be quickly stopped by merely disconnecting the vacuum connection from the vacuum source. The improved apparatus may obviously be manufactured, installed and operated at moderate cost, and is so simple that it may readily be safely operated by a novice.

It should be understood that it is not desired to limit this invention to the exact details of construction or to the precise mode of use, herein shown and described, for various modifications within the scope of the claims may occur to persons skilled in the art.

I claim:

1. A washing machine of the character described for cleaning the milk tubes and teat cups of a milking machine and of the type wherein the teat cups are submerged in the cleansing liquid and comprising, a tank supported for vertical shifting movement, means for biasing the tank to an elevated position, valve means associated with the tank and operable to establish communication between the interior of the tank and a suction line in the elevated position of the tank and to vent the tank to the atmosphere and positively shut off the suction line when the tank descends, and means at the lower end of the tank adapted to be interfitted with a milk tube whereby when the tank is elevated the cleansing liquid will be drawn up through the teat cups and milk tubes into the interior of the tank until the weight of the liquid in the tank overbalances the biasing means whereupon the tank will lower and the liquid flow back through the tube and cup until the tank is empty and is again elevated and the cycle of operation repeated.

2. A washing machine of the character described for cleansing the milk tubes and teat cups of a milking machine and of the type wherein the teat cups are submerged in a cleansing liquid and comprising, a tank, means supporting the tank for shifting movement, means for biasing the tank to one position, valve means associated with the tank and operable to establish communication between the interior of the tank and a suction line when the tank moves in one direction and to vent the interior of the tank to the atmosphere and positively shut off the suction line when the tank moves in the opposite direction, and connecting means at the lower end of the tank adapted to be interconnected with the milk tube whereby when the tank is biased to one of its positions the cleansing liquid will be drawn through the teat cup and milk tube into the tank until the weight of the liquid in the tank overbalances the action of the biasing means and shifts the tank to its other position whereupon the liquid will flow back through the tube and cup until the tank is empty and again shifted under the influence of its biasing means so that the cycle of operation will be repeated.

3. A washing machine for cleaning the milk tubes and teat cups of a milking machine and of the type wherein the teat cups are submerged in the cleansing liquid and comprising, a tank supported for vertical reciprocation, means for biasing the tank to move upwardly, a valve associated with the tank and operable to establish communication between the tank interior and a suction line when the tank moves upwardly and to vent the tank to atmosphere and positively shut off the suction line when the tank moves downwardly, and means at the lower end of the tank adapted for connection with a milk tube whereby when the tank is moving upwardly the cleansing liquid will be drawn up through the teat cups and milk tubes into the interior of the tank until the weight of the liquid in the tank overbalances the biasing means whereupon the tank will lower and the liquid will flow back through the tube and cup until the tank is empty and is again elevated to repeat the cycle of operation.

JOHN A. SCHMITT.